United States Patent
Nakayama et al.

(10) Patent No.: US 10,637,021 B2
(45) Date of Patent: Apr. 28, 2020

(54) WIRING MODULE, DETECTION TERMINAL, AND METHOD FOR MANUFACTURING DETECTION TERMINAL

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Yokkaichi (JP); Naoki Fukushima, Yokkaichi (JP); Katsushi Miyazaki, Yokkaichi (JP); Seishi Kimura, Yokkaichi (JP); Koichiro Mochizuki, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi (JP)

( * ) Notice: Subject to any disclaimer, the term of this patent is extended or adjusted under 35 U.S.C. 154(b) by 201 days.

(21) Appl. No.: 15/768,121

(22) PCT Filed: Oct. 5, 2016

(86) PCT No.: PCT/JP2016/079586
§ 371 (c)(1),
(2) Date: Apr. 13, 2018

(87) PCT Pub. No.: WO2017/068976
PCT Pub. Date: Apr. 27, 2017

(65) Prior Publication Data
US 2018/0351143 A1    Dec. 6, 2018

(30) Foreign Application Priority Data

Oct. 23, 2015    (JP) ................. 2015-208973

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 10/0413* (2013.01);
(Continued)

(58) Field of Classification Search
CPC ............ H01M 2/1077; H01M 10/482; H01M 10/0413; H01M 2/206; H01M 10/48; H01M 2220/20
See application file for complete search history.

(56) References Cited

U.S. PATENT DOCUMENTS

| | | | | |
|---|---|---|---|---|
| 2011/0045329 A1* | 2/2011 | Ikeda | ................. | H01M 2/206 429/91 |
| 2012/0212232 A1* | 8/2012 | Ikeda | ................. | H01M 2/1077 324/426 |
| 2012/0328920 A1* | 12/2012 | Takase | ................. | H01M 2/1077 429/90 |

FOREIGN PATENT DOCUMENTS

| JP | 2010277796 A | 12/2010 |
|---|---|---|
| JP | 2015187910 A | 10/2015 |

OTHER PUBLICATIONS

International Search Report for Application No. PCT/JP2016/079586 dated Nov. 29, 2016; 4 pages.

\* cited by examiner

*Primary Examiner* — Muhammad S Siddiquee
(74) *Attorney, Agent, or Firm* — Reising Ethington, P.C.

(57) ABSTRACT

A wiring module comprising: a bus bar that connects adjacent electrode terminals of a plurality of single batteries each having positive and negative electrode terminals; and a detection terminal that is overlaid on the bus bar and is for detecting a state of a single battery among the plurality of single batteries. The detection terminal is provided with a welded portion welded onto the bus bar, a locked portion that locks to a locking portion provided on the bus bar and holds the detection terminal in a state in which the welded portion is overlaid on the bus bar, and a reinforcing portion that prevents the welded portion from performing a bending deformation so as to keep the welded portion in a flat plate shape overlaid on the bus bar.

5 Claims, 17 Drawing Sheets

(51) Int. Cl.
*H01M 10/04* (2006.01)
*H01M 10/48* (2006.01)
(52) U.S. Cl.
CPC ......... *H01M 10/48* (2013.01); *H01M 10/482* (2013.01); *H01M 2220/20* (2013.01)

WIRING MODULE, DETECTION TERMINAL, AND METHOD FOR MANUFACTURING DETECTION TERMINAL

CROSS REFERENCE TO RELATED APPLICATIONS

This application claims the priority of Japanese patent application JP2015-208973 filed on Oct. 23, 2015, the entire contents of which are incorporated herein.

TECHNICAL FIELD

The technique disclosed in the present specification relates to a wiring module, a detection terminal, and a method for manufacturing a detection terminal.

BACKGROUND ART

A battery module constituted by connecting multiple single batteries in series or in parallel is mounted in a vehicle such as an electric automobile or a hybrid car. This type of battery module includes a wiring module that connects the electrode terminals of adjacent single batteries. The battery module includes a bus bar made of metal that connects the adjacent electrode terminals, and an insulating bus bar holding member that holds the bus bar.

Also, voltage detection wires for detecting the voltages of the single batteries are connected to the electrode terminals of the single batteries in some cases. A configuration in which the detection terminals are clamped to the terminals of the voltage detection wires and the detection terminals are jointly fastened to the electrode terminals along with the bus bars, for example, is known as a configuration for connecting the voltage detection wires to the electrode terminals. This kind of configuration is disclosed in Patent Document 1 (JP2013-16382A).

SUMMARY

Incidentally, in recent years, for connection between a bus bar and an electrode terminal, a method of performing connection using laser welding instead of fastening with bolts and nuts, or the like has been proposed. In this case, the detection terminal cannot be connected through the conventional joint fastening, and therefore it is conceivable that the connection between the detection terminal and the bus bar is also performed through welding such as laser welding.

In order to perform laser welding on the detection terminal, the detection terminal needs to be positioned and placed in a state of being overlaid on the bus bar, and for example, a means has been devised in which a hook-shaped locking piece is provided on the leading end of the detection terminal, the detection terminal is rotated while the locking piece is locked by being passed through a locking hole that forms an opening in the bus bar, and the detection terminal is placed overlaid on the bus bar.

However, with the above-described means, when the detection terminal is rotated and overlaid on the bus bar after the locking piece is passed through the locking hole, there is sometimes a risk that the detection terminal will be bent. There is concern that upon doing so, a gap will be formed between the detection terminal and the bus bar, which will incur a welding failure.

The technique disclosed in the present specification has been completed based on the foregoing circumstance, and aims to enable reliable welding of a detection terminal onto a bus bar.

The technique disclosed in the present specification is a wiring module including: a bus bar that connects adjacent electrode terminals of a plurality of single batteries having positive and negative electrode terminals; and a detection terminal that is overlaid on the bus bar and is for detecting a state of a single battery among the plurality of single batteries, wherein the detection terminal is provided with a welded portion welded onto the bus bar, a locked portion that locks to a locking portion provided on the bus bar and holds the detection terminal in a state in which the welded portion is overlaid on the bus bar, and a reinforcing portion that prevents the welded portion from performing a bending deformation so as to keep the welded portion in a flat plate shape overlaid on the bus bar.

Even if an excessive load is applied to the welded portion of the detection terminal when the detection terminal is overlaid on the bus bar while the locked portion is locked to the locking portion of the bus bar, the welded portion is prevented from performing a bending deformation and is maintained in a flat plate shape due to the welded portion being reinforced by the reinforcing portion. For this reason, the welded portion of the detection terminal can be overlaid in close contact on the bus bar, and as a result, the detection terminal can be reliably, or in other words, strongly welded onto the bus bar.

It is also possible to use the following configurations.

The reinforcing portion of the detection terminal is constituted by using a structure in which a bulging portion that bulges on one side edge of the welded portion is folded over in a form of being in close contact with one surface of the welded portion. It is possible to avoid a case in which an extra protruding portion is formed on the welded portion, and for example, when a jig or the like is used in the welding task, there are no obstructions, which is convenient.

The reinforcing portion of the detection terminal is constituted by a raised portion formed on a side edge of the welded portion. In manufacturing the detection terminal, it is possible to suppress an increase in material and press-working labor to the lowest amount, and consequently, it is possible to contribute to a reduction in manufacturing cost.

The detection terminal is a voltage detection terminal configured to detect a voltage of the single battery.

Also, a detection terminal disclosed in the present specification is a detection terminal to be overlaid on a bus bar that connects adjacent electrode terminals of a plurality of single batteries and is to be used to detect a state of a single battery among the plurality of single batteries, provided with: a welded portion to be welded onto the bus bar, a locked portion that locks to a locking portion provided on the bus bar and holds the detection terminal in a state in which the welded portion is overlaid on the bus bar, and a reinforcing portion that prevents the welded portion from performing a bending deformation so as to keep the welded portion in a flat plate shape overlaid on the bus bar.

Furthermore, a method for manufacturing a detection terminal disclosed in the present specification is a method for manufacturing a detection terminal to be overlaid on a bus bar that connects adjacent electrode terminals of a plurality of single batteries and is to be used to detect a state of a single battery among the plurality of single batteries, wherein the detection terminal is provided with a welded portion to be welded onto the bus bar, a locked portion that locks to a locking portion provided on the bus bar and holds the detection terminal in a state in which the welded portion is overlaid on the bus bar, and a reinforcing portion that prevents the welded portion from performing a bending deformation so as to keep the welded portion in a flat plate shape overlaid on the bus bar, the method comprising forming the reinforcing portion by folding over a bulging portion formed by bulging on one side edge of the welding portion, so as to be in close contact with one surface of the welded portion.

Another method for manufacturing a detection terminal disclosed in the present specification is a method for manufacturing a detection terminal to be overlaid on a bus bar that connects adjacent electrode terminals of a plurality of single batteries and is to be used to detect a state of a single battery among the plurality of single batteries, wherein the detection terminal is provided with a welded portion to be welded onto the bus bar, a locked portion that locks to a locking portion provided on the bus bar and holds the detection terminal in a state in which the welded portion is overlaid on the bus bar, and a reinforcing portion that prevents the welded portion from performing a bending deformation so as to keep the welded portion in a flat plate shape overlaid on the bus bar, the method comprising forming the reinforcing portion by forming a raised portion by bending at a side edge of the welded portion.

According to the technique disclosed in the present specification, it is possible to reliably weld a detection terminal onto a bus bar.

DESCRIPTION OF EMBODIMENTS

Embodiment 1

Embodiment 1 will be described with reference to FIGS. 1 to 14.

Figure 11:
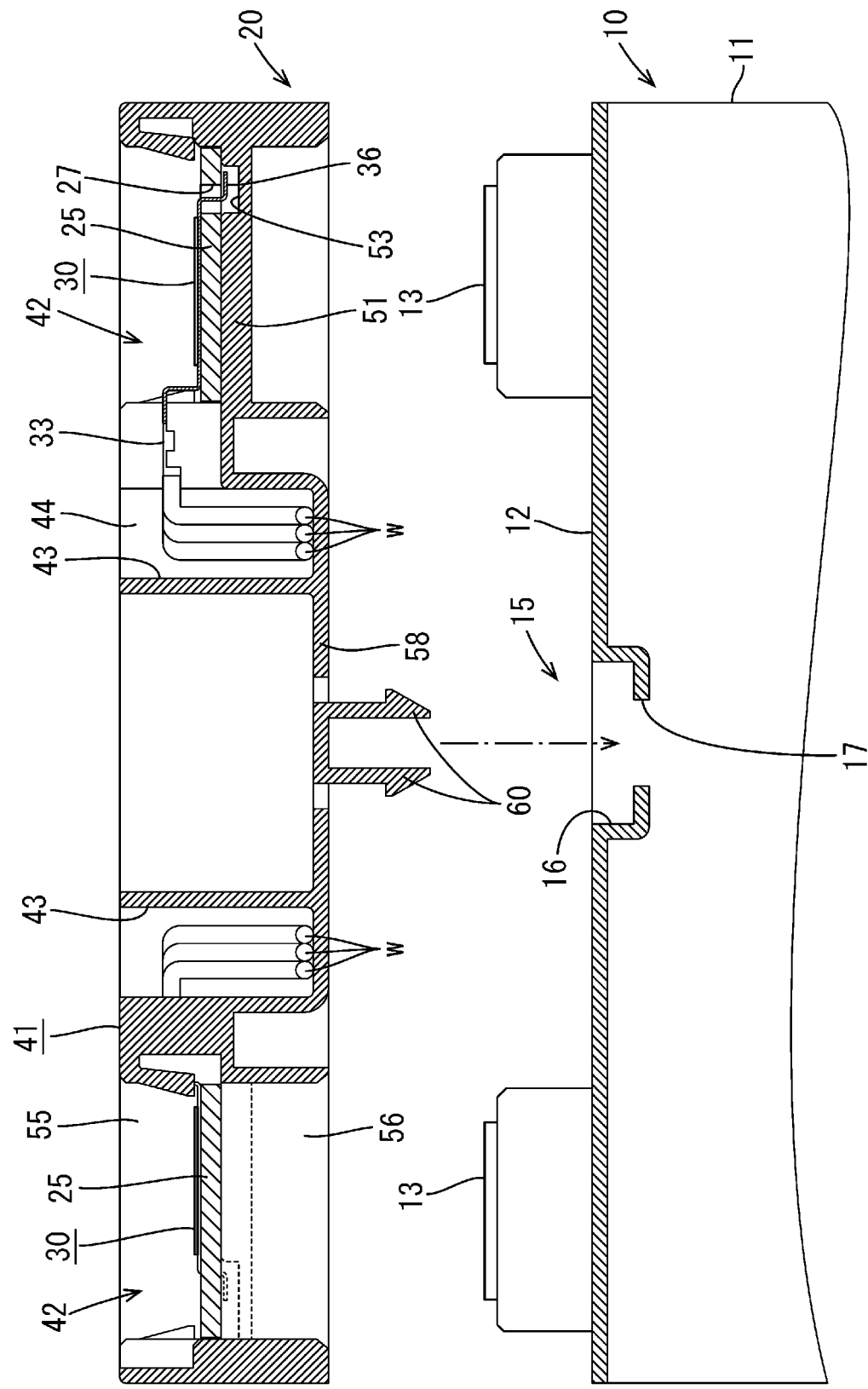
FIG. 11 is a cross-sectional view taken along line XI-XI in FIG. 10, showing an operation of mounting the wiring module on the single battery group.
Figure 12:
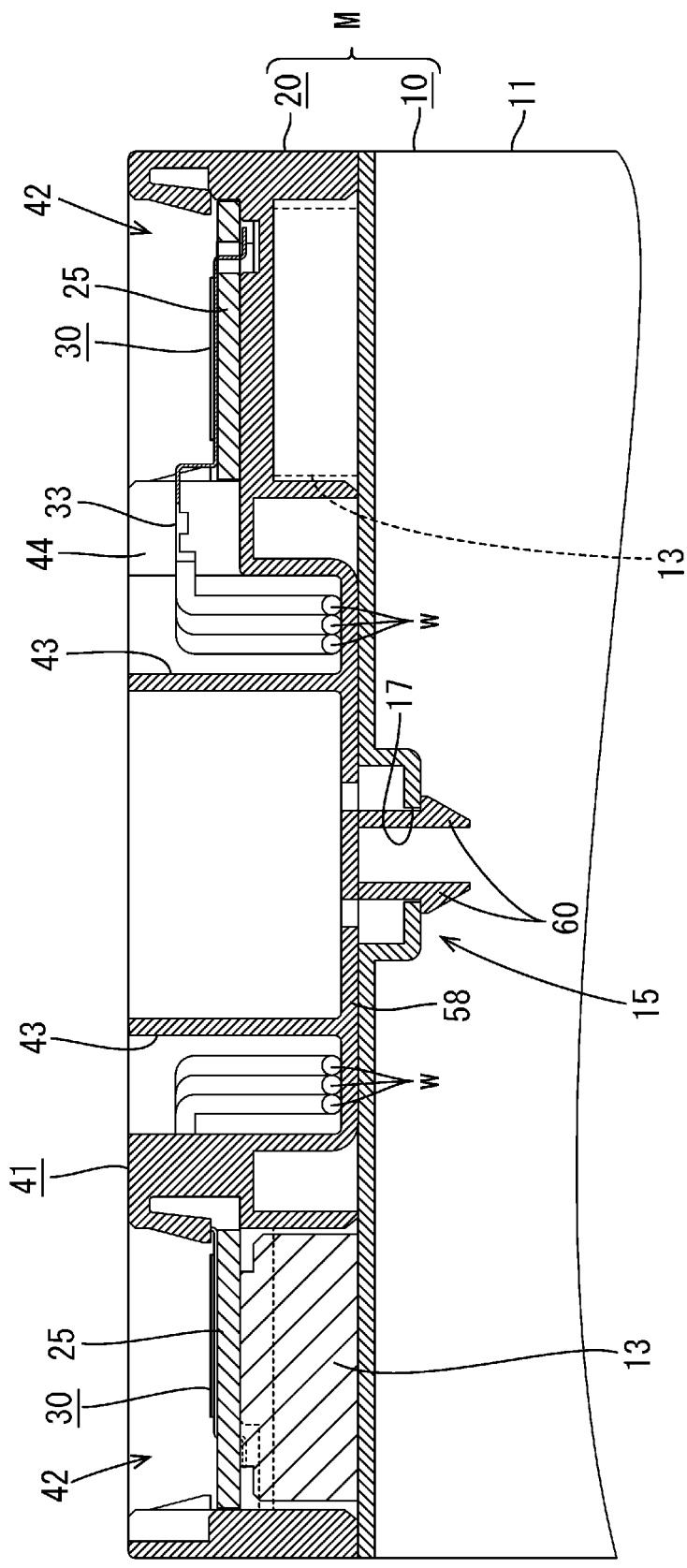
FIG. 12 is a cross-sectional view of a mounted state of the wiring module.

As shown in FIGS. 11 and 12, a wiring module 20 of the present embodiment is attached to the upper surface of a single battery group 10 formed by aligning multiple single batteries 11, to form a battery module M. The battery module M is mounted in a vehicle (not shown) such as an electric automobile or a hybrid car and is used as a power source for driving the vehicle.

Figure 1:
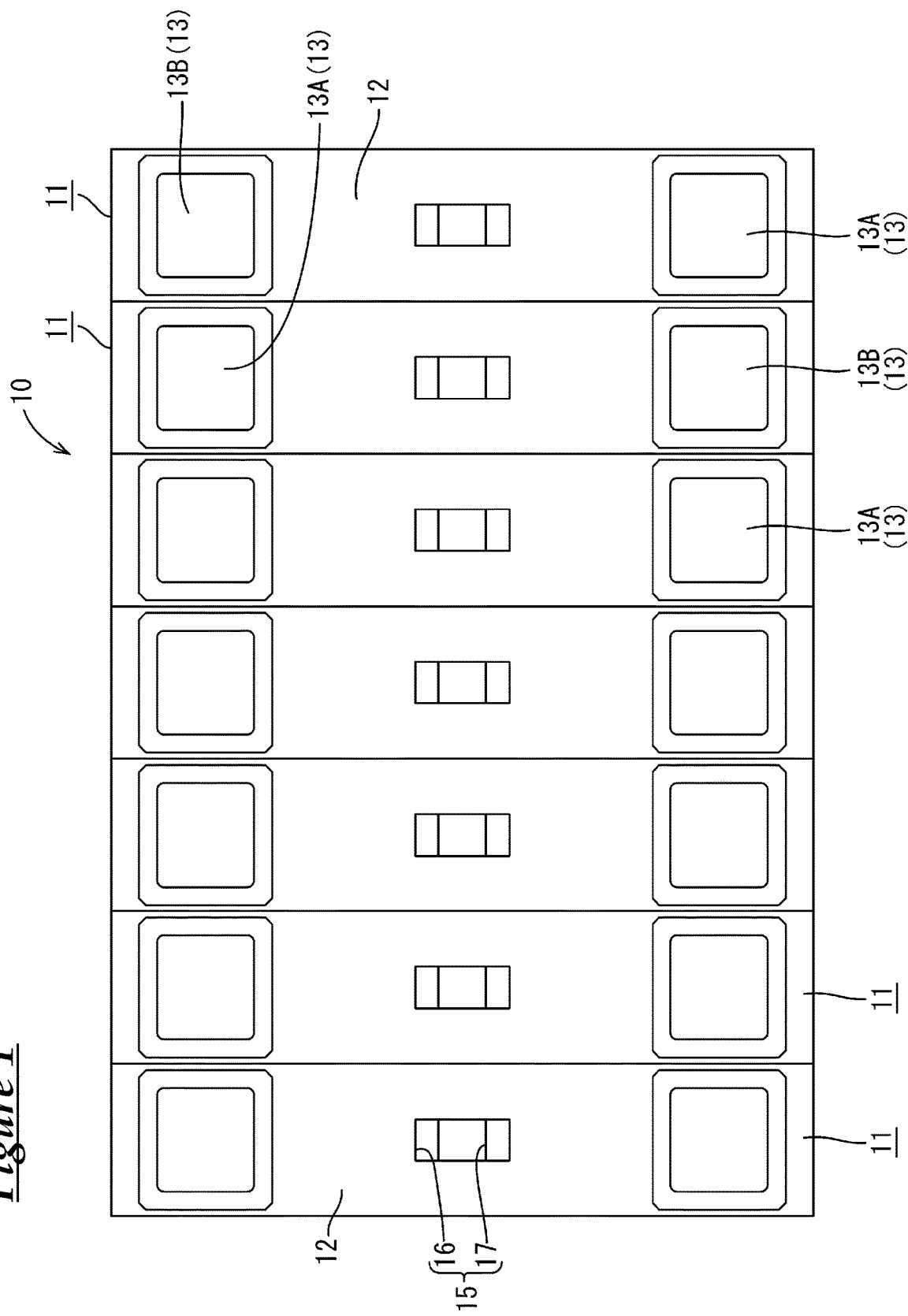
FIG. 1 is a plan view of a single battery group according to Embodiment 1.

The single batteries 11 are secondary batteries and have outer shapes that are flat cuboid shapes, and as shown in FIG. 1, multiple (in the illustrated example, seven) single batteries 11 are aligned in a row to constitute the single battery group 10.

The upper surfaces of the single batteries 11 are electrode arrangement surfaces 12, and pairs of electrode terminals 13 are arranged at positions near the two end portions in the length direction on the electrode arrangement surfaces 12. One of the electrode terminals 13 is a cathode terminal 13A and the other is an anode terminal 13B. The electrode terminals 13 are made of metal and protrude from the electrode arrangement surfaces 12 in the form of rectangular tubes (see FIG. 11).

The multiple single batteries are aligned such that electrode terminals 13 with different polarities are adjacent to each other in two adjacent single batteries 11, or in other words, such that a cathode terminal 13A of one single battery 11 and an anode terminal 13B of another single battery 11 adjacent thereto are adjacent to each other.

A lock portion 15 for locking a lock piece 60 of a later-described insulating protector 40 is provided between the pair of electrode terminals 13 on the electrode arrangement surface 12 of each single battery 11. As shown in FIG. 11, the lock portion 15 has a shape in which a hole portion 17 is provided in the center of a recessed portion 16 formed on the electrode arrangement surface 12.

The wiring module 20 is a member that is to be attached to the upper surface (surface constituted by the electrode arrangement surfaces 12 of the single batteries 11) of the single battery group 10. The wiring module 20 includes an insulating protector 40, bus bars 25 that are held in the insulating protector 40 and connect the cathode terminals 13A and anode terminals 13B of the adjacent single batteries 11, voltage detection terminals 30 that are arranged overlaid on the bus bars 25 and are electrically connected, and voltage detection wires w (hereinafter referred to as "detection wires w") that are connected to the voltage detection terminals 30.

Figure 2:
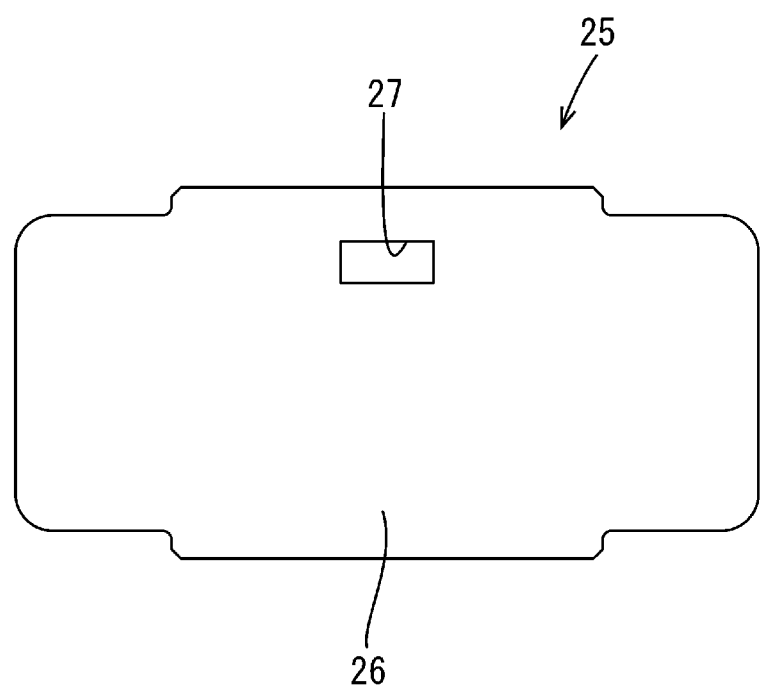
FIG. 2 is a plan view of a bus bar.

The bus bars 25 are formed by press-working metal plates, and as shown in FIG. 2, have approximately rectangular shapes in plan view. Examples of materials for the bus bars 25 include copper, copper alloys, aluminum, aluminum alloys, and stainless steel (SUS).

A widened portion with a form obtained by expanding the side edges on both sides is formed in the central portion in the length direction of the bus bar 25, and the widened portion is used as a mounting portion 26 on which the later-described voltage detection terminal 30 is overlaid and mounted. A rectangular locking hole 27 for locking a locking piece 36 provided on the voltage detection terminal 30 is formed penetrating through the plate surface at a position near one edge of the mounting portion 26.

Figure 6:
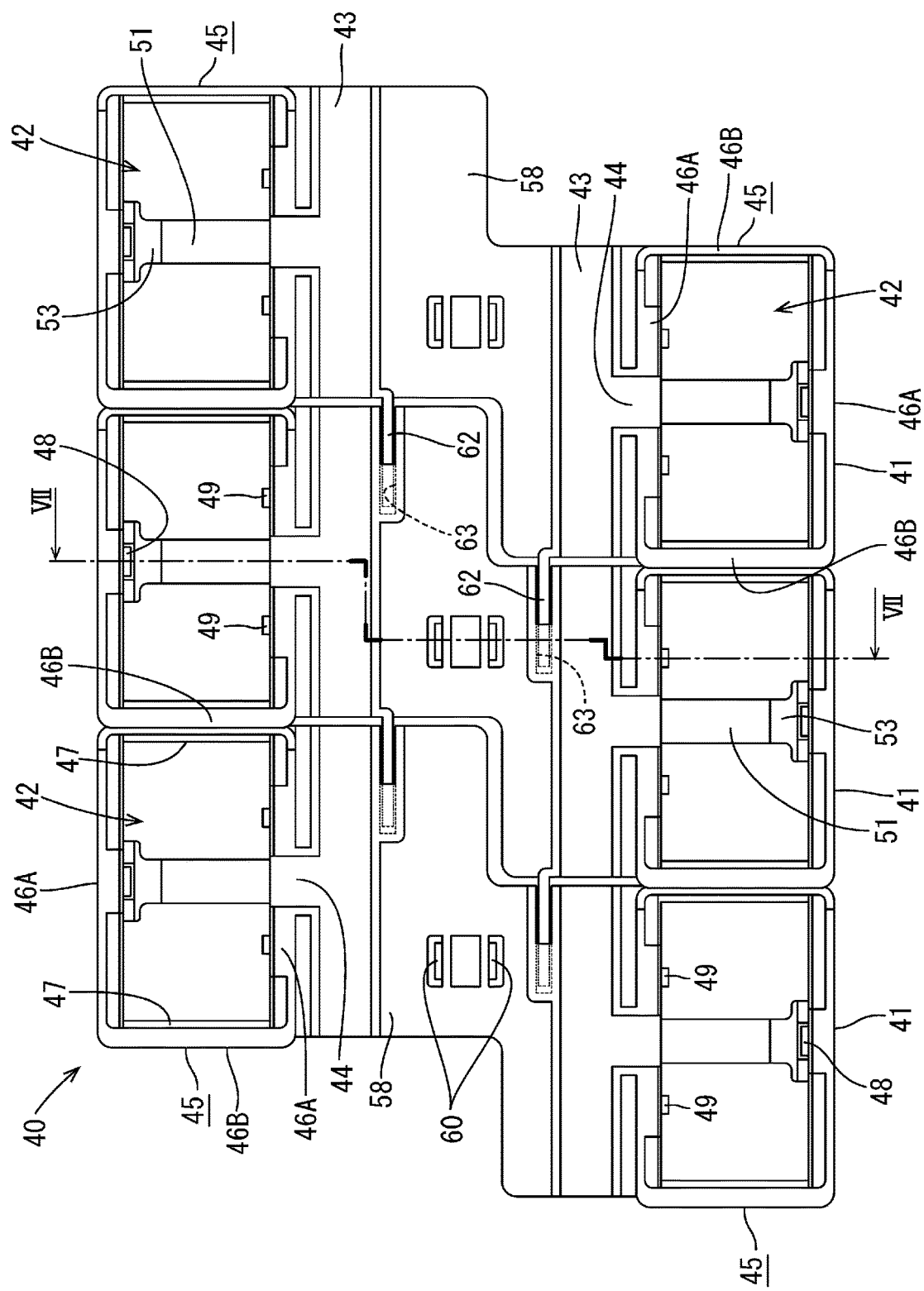
FIG. 6 is a plan view of an insulating protector.

As shown in FIG. 6, the insulating protector 40 is constituted by coupling multiple coupling units 41. In the present embodiment, three coupling units 41 are aligned along the alignment direction of the single batteries 11.

Figure 7:
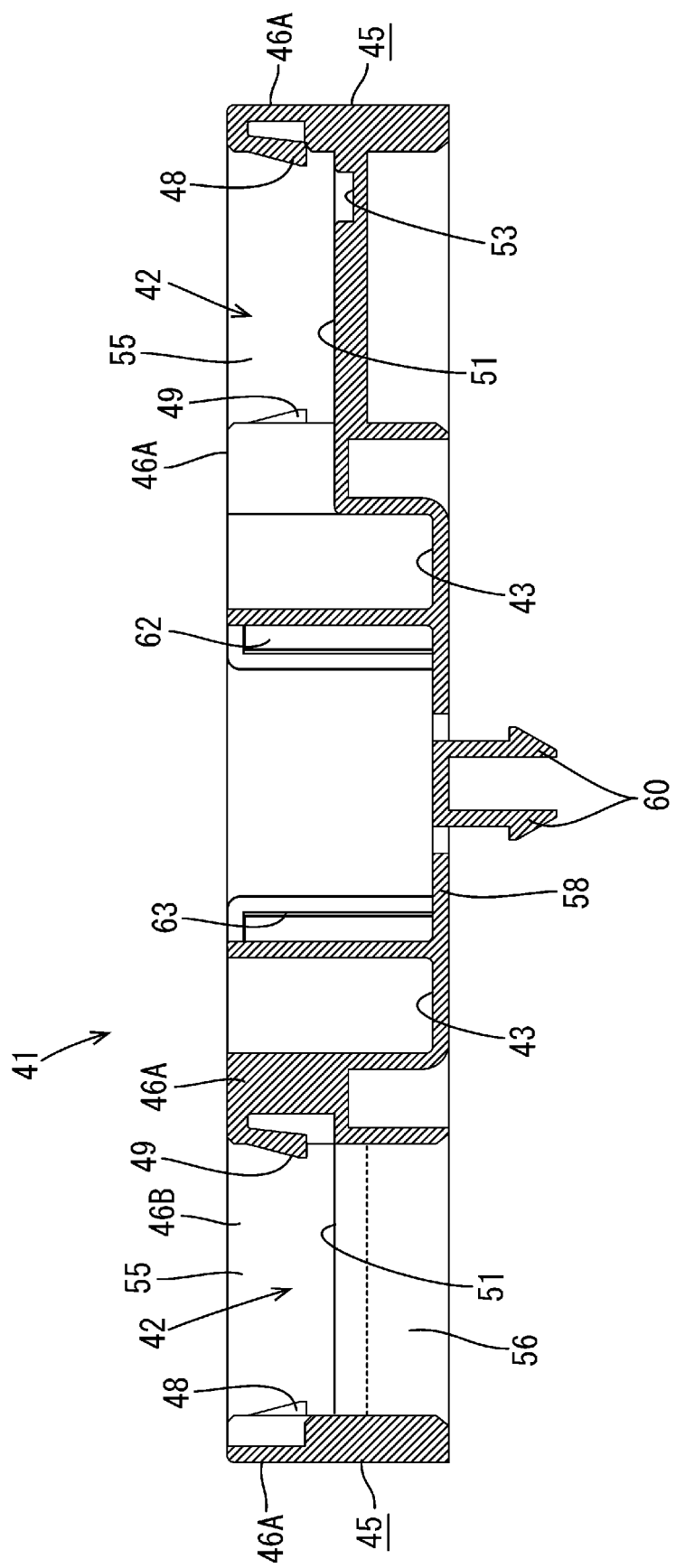
FIG. 7 is a cross-sectional view taken along line VII-VII in FIG. 6.

As shown in FIG. 7, the coupling unit 41 is formed in an approximately thick, flat plate shape, a pair of bus bar holding portions 42 that contain and hold bus bars 25 are formed at the two side edges (upper and lower side edges in FIG. 6) in the length direction, and a pair of wire containing grooves 43 for containing detection wires w connected to the voltage detection terminals 30 arranged overlaid on the bus bars 25 are formed inward of the bus bar holding portions 42.

The bus bar holding portions 42 have rectangular tube-shaped containing walls 45 (constituted by a pair of long walls 46A and a pair of short walls 46B) that contain the bus bars 25 in the interiors thereof and hold the bus bars 25 in a state of being insulated from adjacent bus bars 25. A pair of electrode terminals 13 that are arranged adjacent to each other can approximately tightly fit in the lower portions of the containing walls 45 and be contained therein (see FIG. 10). The containing walls 45 also function as protection walls for the adjacent electrode terminals 13.

As shown in FIG. 6, the pair of containing walls 45 on each coupling unit 41 are arranged shifted in the length direction (left-right direction in FIG. 6) by a dimension corresponding to one electrode terminal 13.

Receiving portions 47 are formed in a protruding manner over the entire regions in the width direction (vertical direction in FIG. 6) of the short walls 46B at approximately central height positions on the inner surfaces of the pair of short walls 46B. The pairs of receiving portions 47 function so as to receive and support the two edges in the length direction of each bus bar 25 contained from above in the containing walls 45 (see FIG. 8).

Among the pair of long walls 46A in each containing wall 45, a long wall 46A on the outer side (both right and left ends in FIG. 7) is provided with a first retaining piece 48 that retains the bus bar 25 contained in the containing wall 45 from above at a central portion in the length direction, and an opposing long wall 46A on the inner side is provided with a pair of second retaining pieces 49 that similarly retain the bus bar 25 contained in the containing wall 45 from above at positions toward the two end portions in the length direction. The first retaining piece 48 and the second retaining pieces 49 are in the form of plate springs that extend diagonally downward toward the inner side of the containing wall 45 from the upper end portion of the long walls 46A, and can elastically deform in the direction of approaching or separating with respect to the long walls 46A.

On the long wall 46A on the inner side, a wire guiding groove 44 for guiding a detection wire w connected to a later-described voltage detection terminal 30 toward the wire containing groove 43 is formed between the pair of second retaining pieces 49 (in the center in the length direction of the long walls 46A).

In the height region of the approximate lower half in the containing wall 45, a partitioning wall 51 is arranged so as to bridge between the opposing surfaces of the inner and outer long walls 46A at the center in the length direction (left-right direction in FIG. 6). The partitioning wall 51 is formed in a channel shape oriented approximately downward.

The end portion toward the outer-side long wall 46A of the partitioning wall 51 is wider than the other portions, and the region near the end portion toward the outer-side long wall 46A is formed such that the upper surface is one step lower over the entire region in the width direction, as shown in FIG. 7 as well, and this lower portion is a relief recessed portion 53 that allows a later-described insertion portion 36 of the detection terminal 30 to pass. The above-described locking hole 27 of the bus bar 25 is set such that at least a portion thereof is arranged at a position corresponding to the relief recessed portion 53 (see FIG. 9).

The width dimension of the regions other than the wide region of the partitioning wall 51 is set to a dimension that is slightly smaller than the dimension between the adjacent electrode terminals 13. In other words, it is set to a dimension according to which the partitioning wall 51 fits between the adjacent electrode terminals 13. Also, the upper surface of the region other than the relief recessed portion 53 of the partitioning wall 51 is set to a height that is the same as the upper surface of the above-described receiving portion 47.

With the above-described configuration, the bus bar holding portion 42 is functionally divided into two portions in the vertical direction, the upper side being a bus bar containing portion 55 that contains a bus bar 25, and the lower side being an electrode containing portion 56 that contains electrode terminals 13 (see FIGS. 7 and 11).

A coupling portion 58 spans between the pair of wire containing grooves 43 provided in each coupling unit 41. The coupling portion 58 is a plate-shaped member and couples the lower surfaces of the pair of wire containing grooves 43 (see FIG. 7). As stated above, the pair of bus bar holding portions 42 are arranged shifted by a dimension corresponding to one electrode terminal 13 with respect to each other in the length direction, and therefore the coupling portions 58 that are extended from the wire containing grooves 43 are coupled shifted in the left-right direction in FIG. 6 by a dimension corresponding to one electrode terminal 13. Thus, the coupling portions 58 are approximately Z-shaped overall in plan view.

On the coupling portion 58, a pair of lock pieces 60 that can elastically lock to the hole edges of the hole portion 17 of the lock portion 15 are formed protruding downward at positions corresponding to the lock portion 15 of a single battery 11 in the state in which the insulating protector 40 is attached to the single battery group 10 (see FIG. 11).

The coupling structure of three coupling units 41 will be described simply. As shown in FIG. 6, a unit engagement portion 62 is formed protruding at one coupling portion 58 of the adjacent coupling units 41, and a unit engagement receiving portion 63 that fits into and locks the unit engagement portion 62 is formed in a predetermined correspondence relationship on the other coupling portion 58.

The unit engagement portions 62 of the coupling units 41 and the unit engagement reception portions 63 are engaged to each other, whereby the adjacent coupling units 41 are coupled to each other to constitute the insulating protector 40.

The voltage detection terminal 30 is for detecting the voltage of a single battery 11 and is electrically connected to the electrode terminal 13 of the single battery 11 via the bus bar 25. The voltage detection terminal 30 is formed by press-working a metal plate made of copper, a copper alloy, stainless steel, aluminum, or the like into a predetermined shape. Note that the voltage detection terminal 30 is thinner than the bus bar 25 (see FIG. 12). The surface of the voltage detection terminal 30 may be plated with a metal such as tin or nickel.

Figure 3:
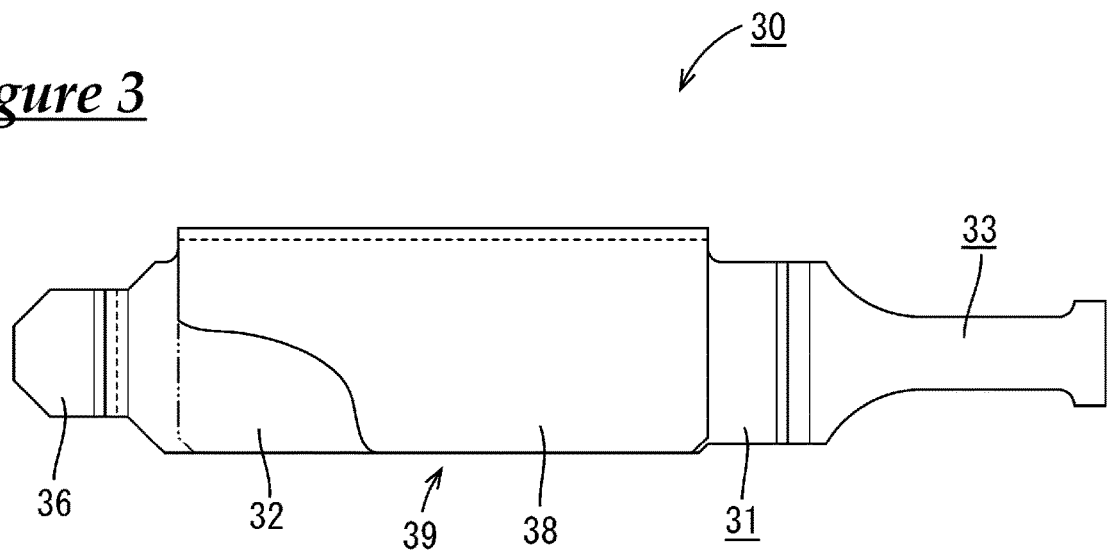
FIG. 3 is a partially cut-out plan view of a voltage detection terminal.
Figure 4:
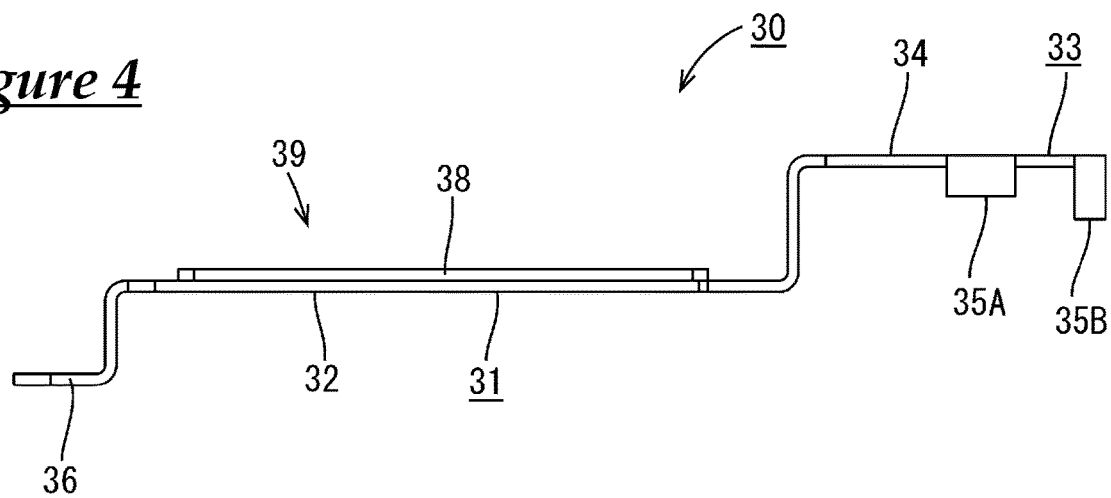
FIG. 4 is a front view of the voltage detection terminal.
Figure 5:
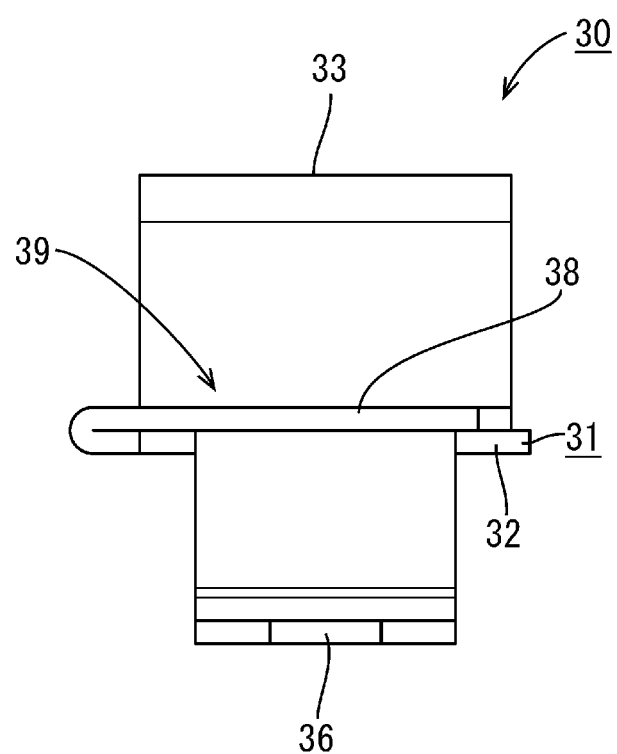
FIG. 5 is an enlarged side view of the voltage detection terminal.

As shown in FIGS. 3 to 5, the voltage detection terminal 30 of the present embodiment has a shape in which the wire connection portion 33 is included on the rear end of a terminal main body portion 31, which has a band shape. The central region excluding the two ends in the length direction of the terminal main body portion 31 is a welded portion 32 that is to be welded onto the bus bar 25 as described later.

The wire connection portion 33 has a shape in which a wire barrel 35A that is crimped to an exposed core wire at the terminal end of the detection wire w and an insulation barrel 35B that is crimped to the terminal end of an insulation coating of the detection wire w are formed in alignment in the front-rear direction on a ceiling plate 34 that is formed in an extended manner at a position that is a step higher than the terminal main body portion 31.

A locking piece 36 for inserting into the locking hole 27 of the above-described bus bar 25 and locking the voltage detection terminal 30 is formed on the leading end of the terminal main body portion 31. The locking piece 36 is formed so as to have a crank shape obtained by bending at a right angle downward from the leading end of the terminal main body portion 31, and thereafter bending frontward at a right angle.

Although described in detail later, the voltage detection terminal 30 is rotated while the locking piece 36 on the leading end is locked by being passed through the locking hole 27 that forms an opening on the mounting portion 26 of the bus bar 25, the welding portion 32 is positioned and overlaid on the mounting portion 26, and the welded portion 32 is bonded to the bus bar 25 through laser welding.

The voltage detection terminal 30 of the present embodiment is provided with a reinforcing portion 39 that prevents the above-described welded portion 32 from performing a bending deformation. Specifically, a bulging portion 38 with the same width as the welded portion 32 is formed so as to bulge from one side edge of the welded portion 32, and the bulging portion 38 is folded over on the upper surface of the welded portion 32 so as to obtain a so-called double-folded structure, whereby the reinforcing portion 39 is constituted.

Next, an example of a procedure for assembling the battery module M of the present embodiment will be described.

First, the wiring module 20 is assembled. For that, the three coupling units 41 are sequentially coupled while the unit engagement portions 62 are engaged to the unit engagement receiving portions 63 according to the method described above, and thereby the insulation protector 40 is formed as shown in FIG. 6.

Figure 8:
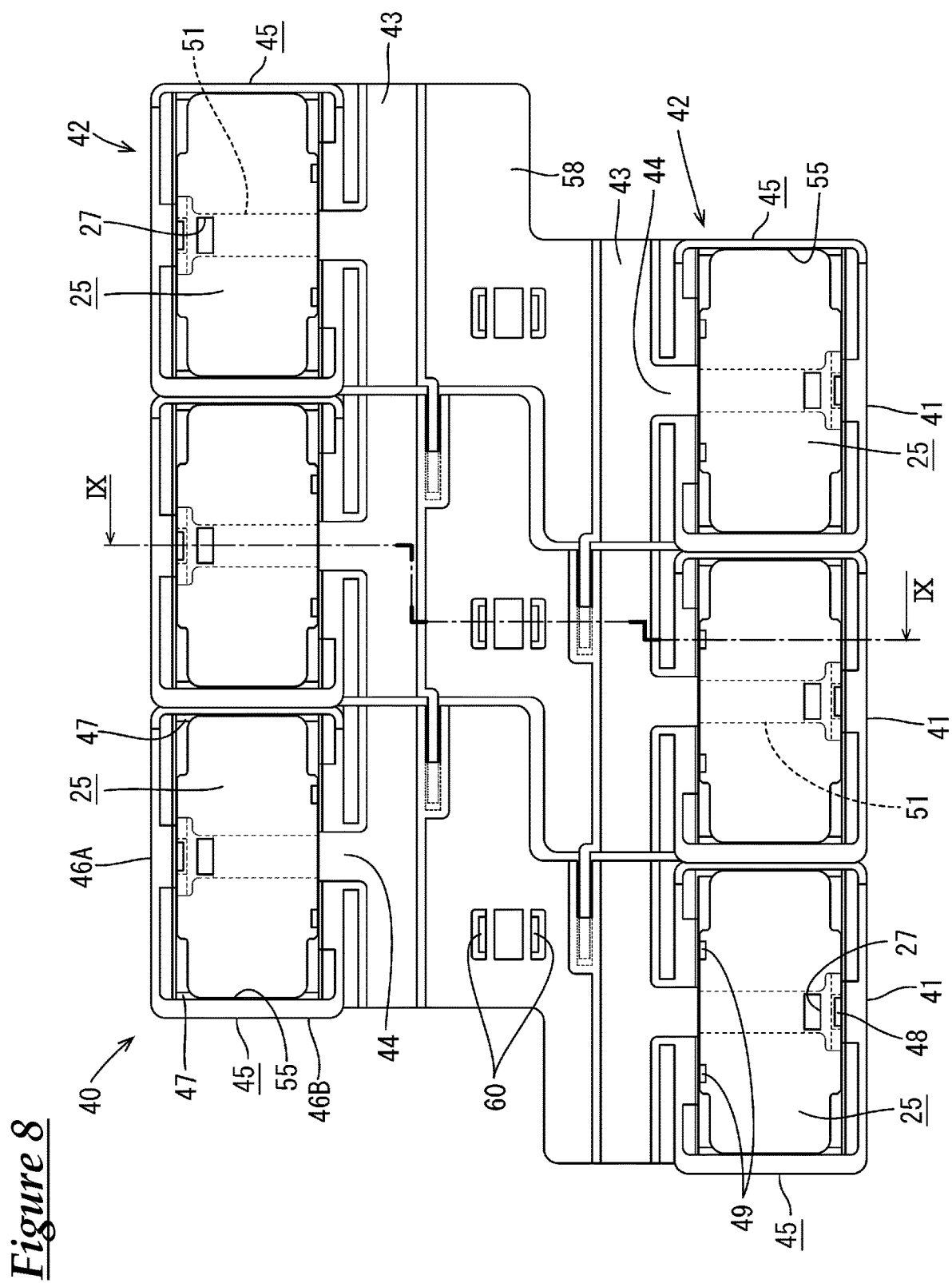
FIG. 8 is a plan view of the insulating protector in a state in which bus bars are mounted.
Figure 9:
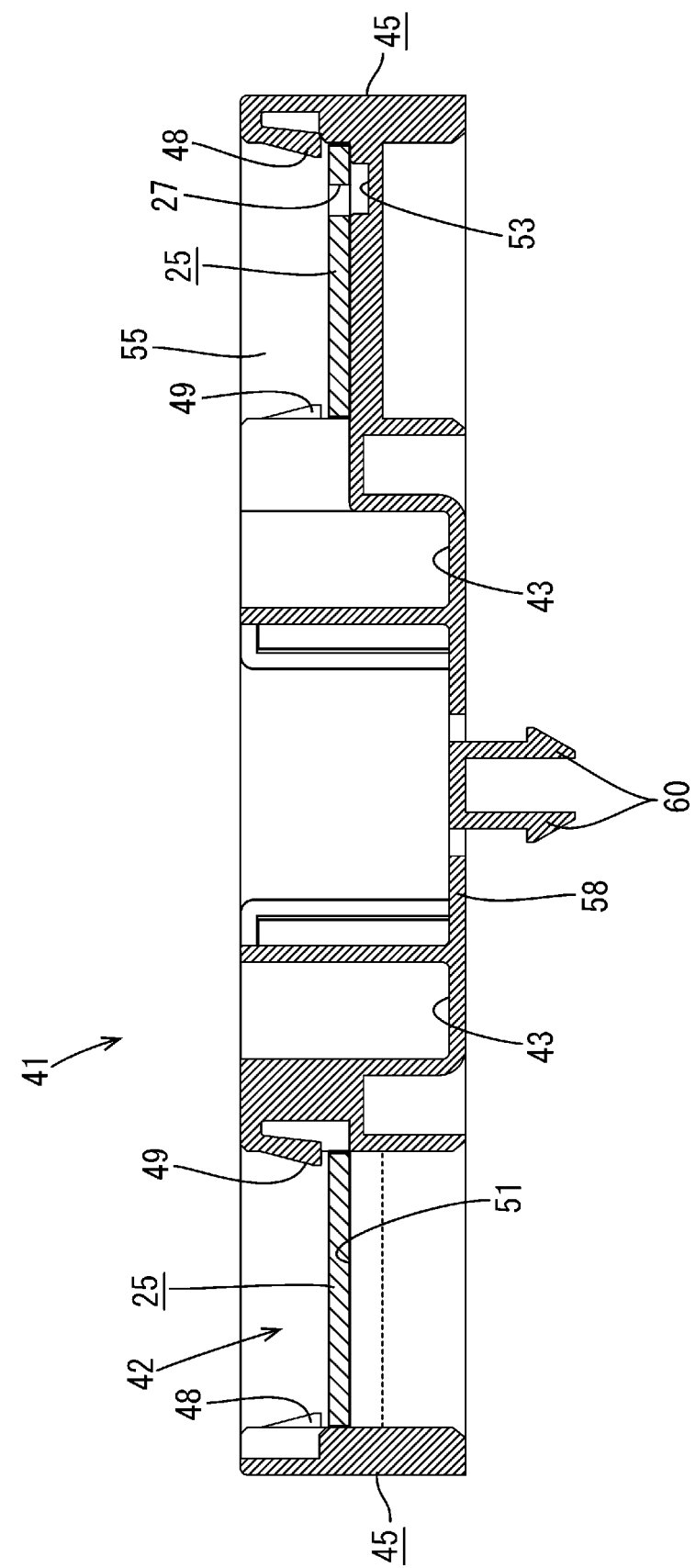
FIG. 9 is a cross-sectional view taken along line IX-IX in FIG. 8.
Figure 10:
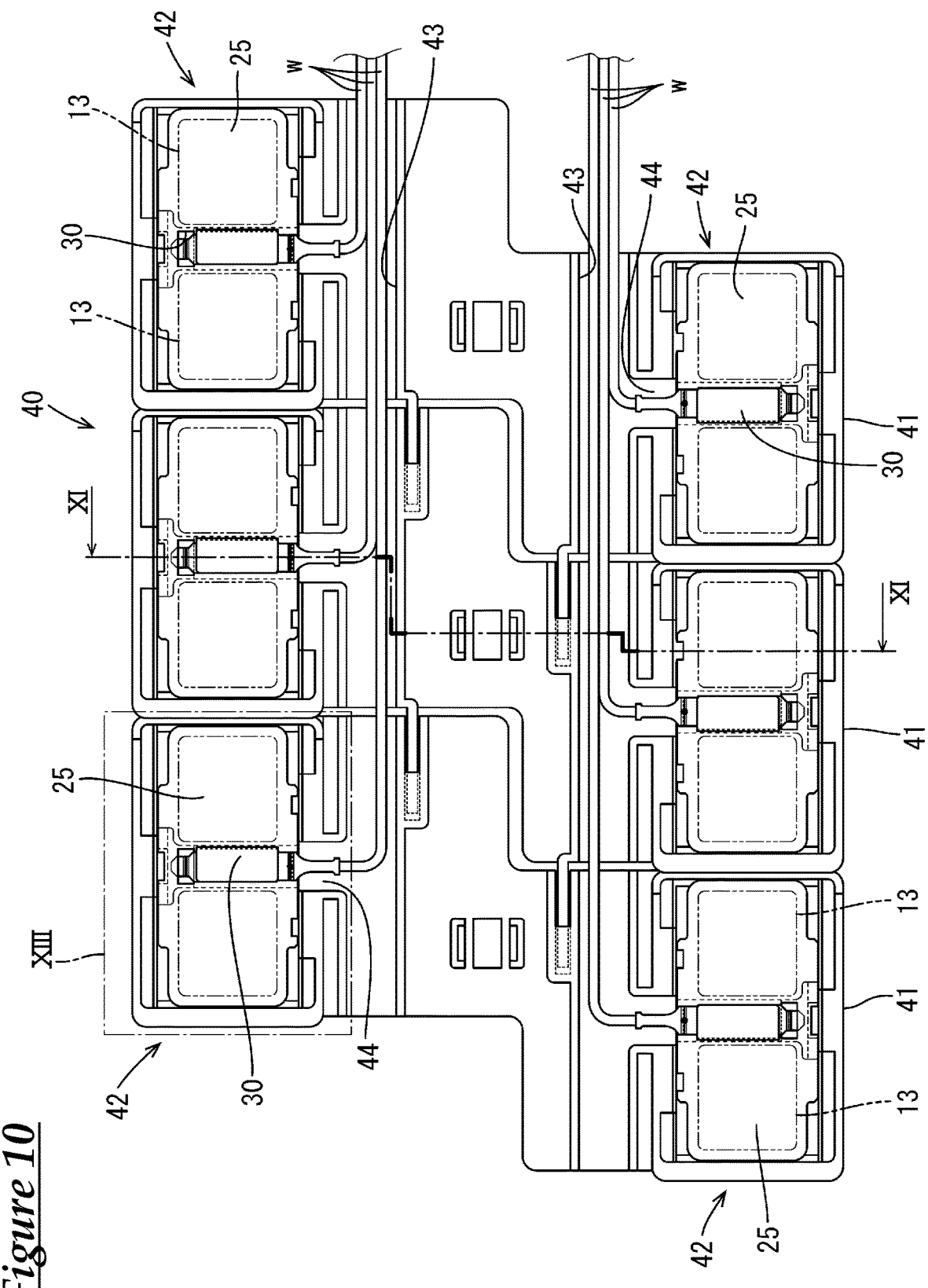
FIG. 10 is a plan view of a wiring module.

Next, the bus bars 25 are contained in the bus bar holding portions 42 of the insulating protector 40. The bus bars 25 are pressed downward into the bus bar containing portions 55 while being guided by the containing walls 45, and specifically, the first retaining pieces 48 and the second retaining pieces 49 are pressed in while being elastically deformed. As shown in FIGS. 8 and 9, the bus bars 25 are pressed until they come into contact with the receiving portions 47 and the partitioning walls 51, whereupon the first retaining pieces 48 and the second retaining pieces 49 elastically revert, and thus the bus bars 25 are held in a state of being retained from above. The bus bars 25 are put in a state in which the regions on the underside surfaces thereof, between the receiving portions 47 and the partitioning walls 51 are exposed downward.

Next, the voltage detection terminals 30 are mounted on the insulation protector 40. Prior to that, the terminals of the detection wires w are connected to the wire connection portions 33 of the voltage detection terminals 30 by crimping the barrels 35A and 35B. The voltage detection terminals 30 are overlaid on the mounting portions 26 of the bus bars 25 from above. Specifically, the voltage detection terminals 30 are brought close to the bus bars 25 while slightly inclined with respect thereto such that the locking piece 36 sides on the leading ends are located below, and after the locking pieces 36 are inserted into the locking holes 27 of the bus bars 25, the voltage detection terminals 30 are rotated so as to lower the wire connection portion 33 sides, and the welded portions 32 are overlaid on the mounting portions 26 of the bus bars 25 (see FIGS. 10 and 11).

At this time, depending on the degree to which the locking piece 36 catches on the locking hole 27, the size of the rotation force, and the like, there is a risk that an excessive load will act on the welded portion 32 of the voltage detection terminal 30, and a bending force will be applied to the welded portion 32, partly because it is thin. However, the reinforcing portion 39 composed of the double-folded structure is formed on the welded portion 32 so as to increase the bending rigidity, and therefore the welding portion 32 is prevented from performing a bending deformation and is maintained in a flat plate shape. As a result, the welded portion 32 of the voltage detection terminal 30 is overlaid in close contact on the mounting portion 26 of the bus bar 25 with no gap therebetween.

In addition, the wire connection portion 33 of the voltage detection terminal 30 is contained in the wire guiding groove 44 and the detection wire w guided from the wire connection portion 33 is wired by being contained in the wire containing groove 43. In this state, the voltage detection terminal 30 is held in a state of being positioned at a predetermined position in the bus bar holding portion 42. Accordingly, the assembly of the wiring module 20 is completed.

The wiring module 20 assembled in this manner is attached to the electrode arrangement surfaces 12 of the power storage element group 10. Specifically, as shown in FIG. 11, the lock pieces 60 of the insulating protectors 40 are locked by being inserted into the lock portions 15 of the single batteries 11. Upon doing so, as shown in FIG. 12, the containing walls 45 surround the adjacent pairs of electrode terminals 13 and the partitioning walls 51 are fit between the adjacent electrode terminals 13. In other words, the electrode terminals 13 are contained in the electrode containing portions 56 of the bus bar holding portions 42. Also, the upper surfaces of the electrode terminals 13 come into contact with the lower surfaces of the bus bars 25 that are exposed downward. From this state, the bus bar 25 is irradiated with a laser by a laser irradiation apparatus (not shown) arranged above the wiring module 20 while being held down with an appropriate jig, and the bus bar 25 and the electrode terminal 13 are welded through laser welding.

Figure 13:
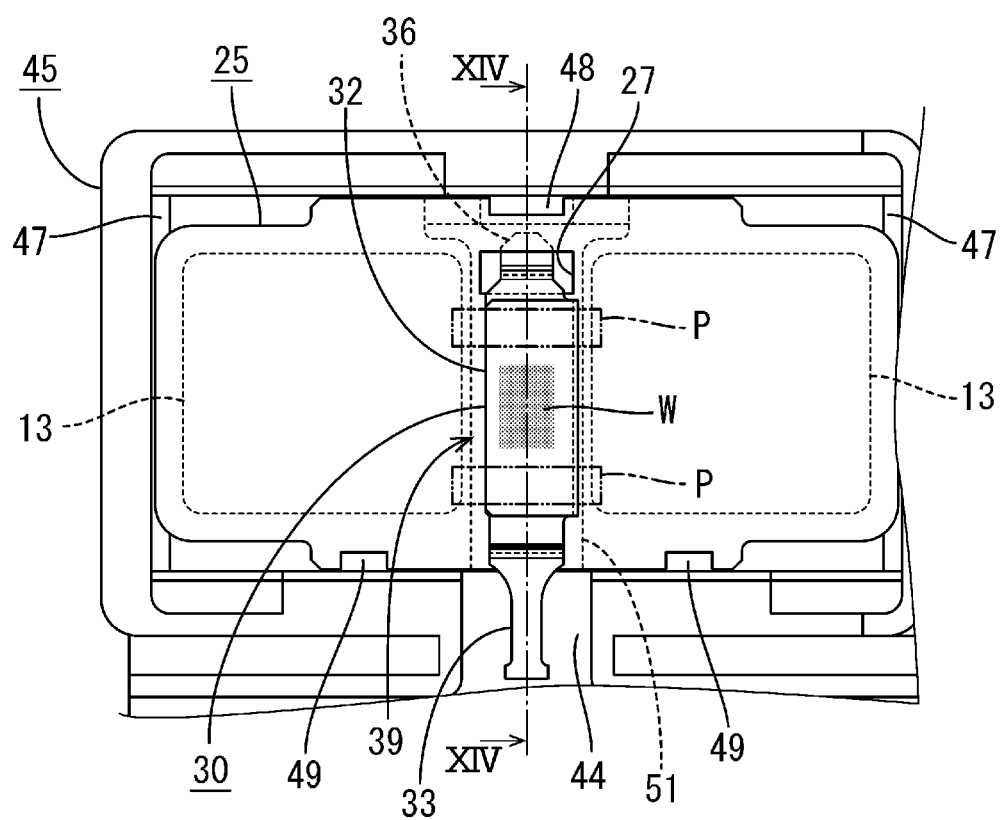
FIG. 13 is an enlarged plan view of portion XIII in FIG. 10, showing a welded state of the voltage detection terminal.
Figure 14:
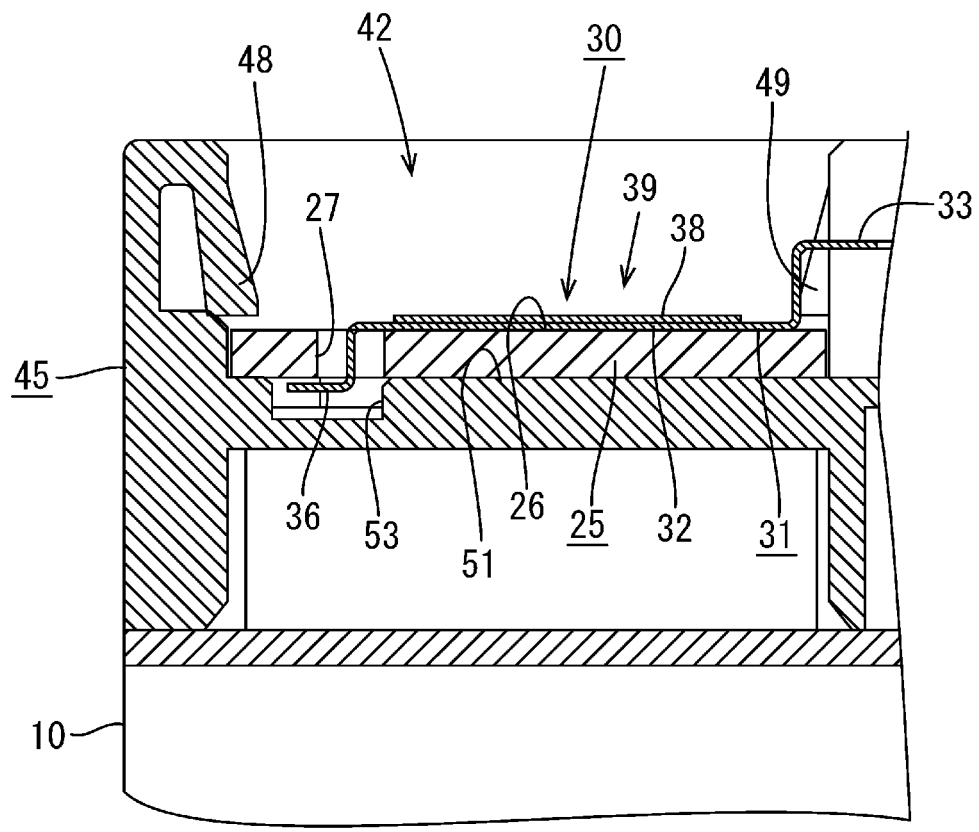
FIG. 14 is an enlarged cross-sectional view taken along line XIV-XIV in FIG. 13.

Also, as shown in FIG. 13, while the voltage detection terminal 30 is held down with an appropriate jig (pressing portion P), the welded portion 32 (strictly speaking, the double-folded bulging portion 38) is irradiated with a laser by a laser irradiation apparatus, and the welding portion 32 of the voltage detection terminal 30 and the mounting portion 26 of the bus bar 25 are welded through laser welding (welded region W). As described above, the welded portion 32 of the voltage detection terminal 30 is provided with a reinforcing portion 39, and thus is laser welded in a state of being overlaid in close contact on the mounting portion 26 of the bus bar 25 with no gap therebetween, as a result of which welding is performed regularly over the entire welding region.

As described above, the battery module M is completed. Note that the terminal end on the opposite side of the detection wire w that is pulled out from the voltage detection terminal 30 and is wired through the wire containing groove 43 is connected to an ECU (Electronic Control Unit) (not shown), whereby a voltage detection means for the single battery 11 is constructed.

According to the present embodiment, the following effects can be obtained.

When the locking piece 36 of the voltage detection terminal 30 is rotated while locked by being inserted into the locking hole 27 of the bus bar 25 and the voltage detection terminal 30 is overlaid on the mounting portion 26 of the bus bar 25, even if an excessive load is applied to the welded portion 32 of the voltage detection terminal 30, the welded portion 32 is reinforced by the reinforcing portion 39, and thus the welded portion 32 is prevented from performing a bending deformation and is maintained in a flat plate shape. For this reason, the welded portion 32 of the voltage detection terminal 30 can be overlaid in close contact on the mounting portion 26 of the bus bar 25 and can be laser welded regularly over the entire surface, and consequently, the voltage detection terminal 30 can be strongly fixed to the bus bar 25.

The reinforcing portion 39 of the voltage detection terminal 30 of the present embodiment is formed by obtaining a double-folded structure in which the bulging portion 38 formed by bulging on the side edge of the welded portion 32 is folded over on the upper surface of the welded portion 32. With this structure, it is possible to avoid a case in which an extra protruding portion is formed on the upper surface side of the welded portion 32, there is no obstruction when a jig is used during laser welding, or in other words, the pressing portion P of the jig can be obtained widely as shown in FIG. 13, and more accurate laser welding can be realized.

Embodiment 2

Embodiment 2 will be described with reference to FIGS. 15 to 19. In Embodiment 2, a change is added to the structure of the reinforcing portion 72 provided on the welded portion 32 of the voltage detection terminal 30X. Hereinafter, differences from Embodiment 1 will mainly be described, members and portions that have the same functions as in Embodiment 1 will be denoted by the same reference numerals thereas, and description thereof will be omitted or simplified.

Figure 15:
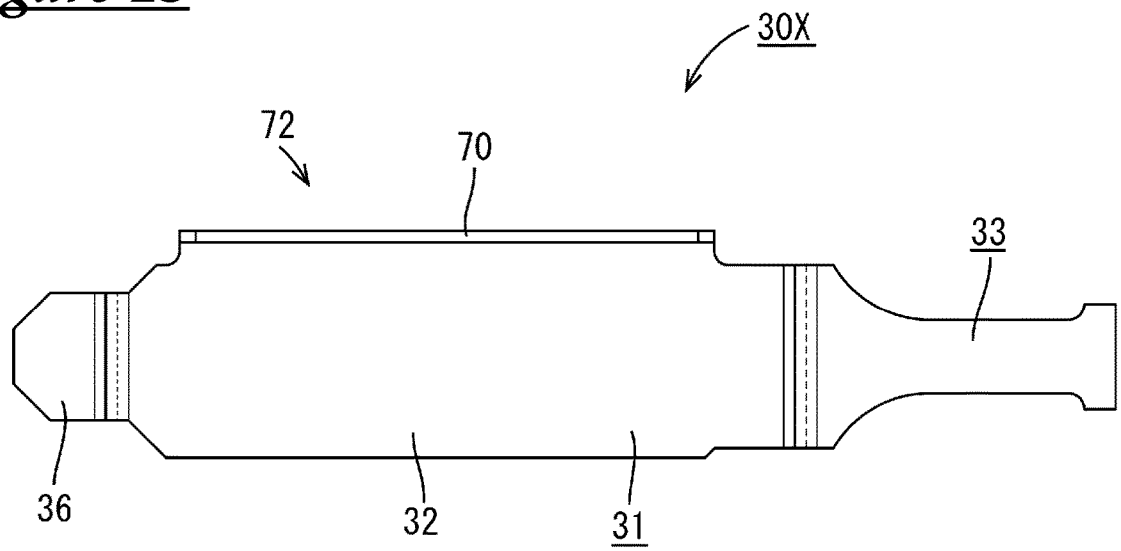
FIG. 15 is a plan view of a voltage detection terminal according to Embodiment 2.
Figure 16:
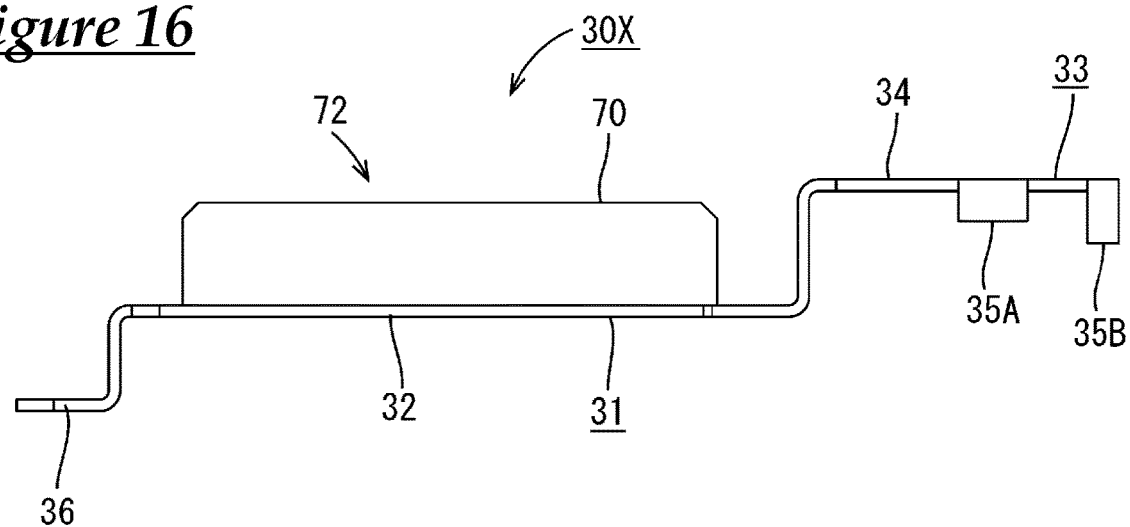
FIG. 16 is a front view of the voltage detection terminal.
Figure 17:
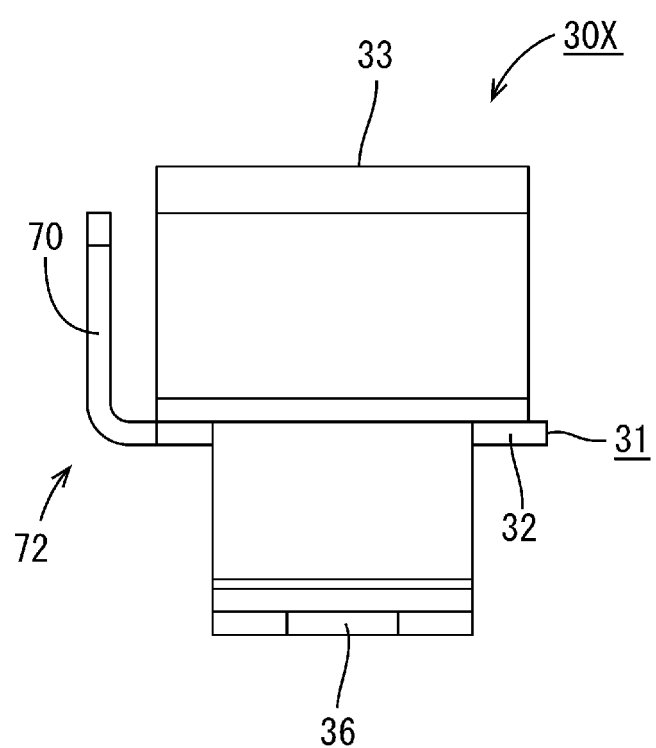
FIG. 17 is an enlarged side view of the voltage detection terminal.
Figure 18:
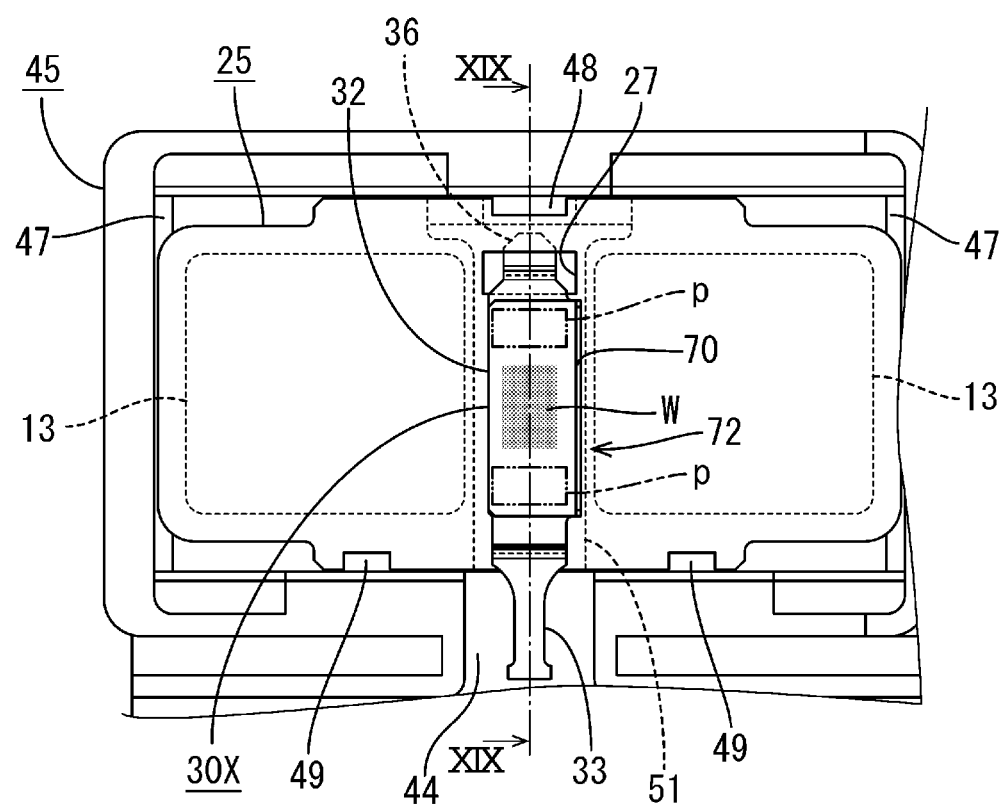
FIG. 18 is a partial plan view of a welded state of the voltage detection terminal.
Figure 19:
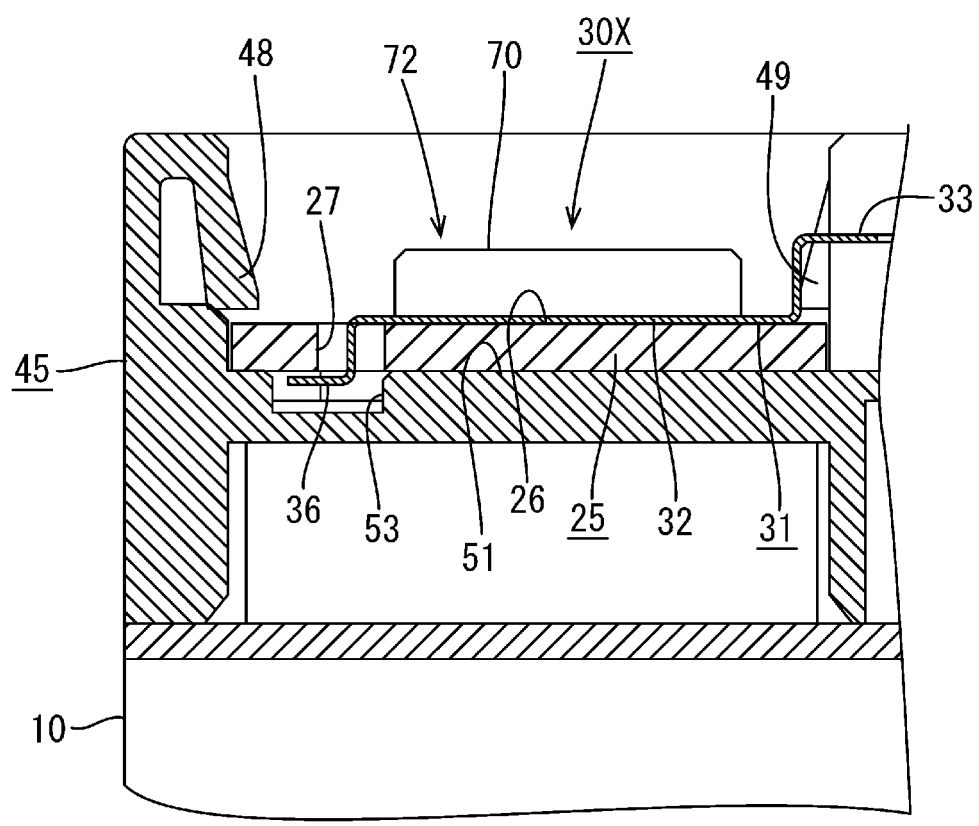
FIG. 19 is an enlarged cross-sectional view taken along line XIX-XIX in FIG. 18.

With the voltage detection terminal 30X of this embodiment, as shown in FIGS. 15 to 17, a raised portion 70 is formed bent at a right angle on one side edge of the welded portion 32, and the reinforcing portion 72 is formed thereby.

The voltage detection terminal 30X is similarly rotated such that the wire connection portion 33 side is lowered after the locking piece 36 is inserted into the locking hole 27 of the bus bar 25 in an inclined orientation in which the locking piece 36 side of the leading end is located downward, and the welded portion 32 is overlaid on the mounting portion 26 of the bus bar 25. Thereafter, the voltage detection terminal 30X is held down with an appropriate jig (held-down portion P), the welded portion 32 is irradiated with a laser by a laser irradiation apparatus, the welded portion 32 of the voltage detection terminal 30X and the mounting portion 26 of the bus bar 25 are welded through laser welding (welded region W).

With the voltage detection terminal 30X of the present embodiment as well, when the locking piece 36 is similarly rotated while locked by being inserted into the locking hole 27 of the bus bar 25 and the voltage detection terminal 30X is overlaid on the mounting portion 26 of the bus bar 25, even if an excessive load is applied to the welded portion 32 of the voltage detection terminal 30X, the welded portion 32 is reinforced by the reinforcing portion 72, and thus the welded portion 32 is prevented from performing a bending deformation. Similarly, the welded portion 32 of the voltage detection terminal 30X can be overlaid in close contact on the mounting portion 26 of the bus bar 25 and can be laser welded regularly over the entire surface, and consequently, the voltage detection terminal 30X can be strongly fixed to the bus bar 25.

The reinforcing portion 72 of the voltage detection terminal 30X of the present embodiment has a configuration in which the raised portion 70 is formed bent at a right angle on one side edge of the welded portion 32, and therefore in manufacturing the voltage detection terminal 30X, it is possible to suppress an increase in material and press-working labor to the lowest amount, and consequently, it is possible to contribute to a reduction in manufacturing cost.

Other Embodiments

The technique disclosed in the present specification is not limited to the embodiments described through the above description and drawings, and for example, the following embodiments are also encompassed within the technical scope.

In the above-described embodiment, laser welding was described as an example of a means for welding the voltage detection terminal and the bus bar, but the technique disclosed in the present specification can be similarly applied also in the case of employing another welding means, such as ultrasonic welding or soldering (a type of welding).

The locking means for holding the voltage detection terminal in the orientation of being overlaid on the bus bar is not limited to that described as an example in the above-described embodiments, and for example, it is also possible to employ another locking means, such as providing an arch-shaped locking portion on the bus bar, rotating the voltage detection terminal while passing the leading end (locked portion) of the voltage detection terminal through the locking portion, and overlaying the voltage detection terminal on the bus bar.

If the reinforcing portion is constituted by the double-folded structure of the welded portion, the double-folded portion can be changed as appropriate, such as performing fixing at only a predetermined width instead of over the entire width of the welded portion.

If the reinforcing portion is constituted by forming a raised portion on the side edge of the welded portion, changes can be performed as appropriate, such as forming the raised portion on both side edges or fixing the forming region of the raised portion to a predetermined length.

In the above-described embodiment, an example was given in which the voltage detection terminal is welded onto the bus bar, but the present invention can be applied also to the case of welding another detection terminal, such as a current detection terminal or a temperature detection terminal.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 Single battery
13, 13A, 13B Electrode terminal
20 Wiring module
25 Bus bar
27 Locking hole (locking portion)
30, 30X Voltage detection terminal (detection terminal)
32 Welded portion
36 Locking piece (locked portion)
38 Bulging portion
39 Reinforcing portion
70 Raised portion
72 Reinforcing portion

The invention claimed is:

1. A wiring module comprising:
   a bus bar that connects adjacent electrode terminals of a plurality of single batteries having positive and negative electrode terminals; and
   a detection terminal that is overlaid on the bus bar and is for detecting a state of a single battery among the plurality of single batteries,
   wherein the detection terminal is provided with:
      a welded portion welded onto the bus bar,
      a locked portion that locks to a locking portion provided on the bus bar and holds the detection terminal in a state in which the welded portion is overlaid on the bus bar, and
      a reinforcing portion that prevents the welded portion from performing a bending deformation so as to keep the welded portion in a flat plate shape overlaid on the bus bar.

2. The wiring module according to claim 1, wherein the reinforcing portion of the detection terminal is constituted by using a structure in which a bulging portion that bulges on one side edge of the welded portion is folded over in a form of being in close contact with one surface of the welded portion.

3. The wiring module according to claim 1, wherein the reinforcing portion of the detection terminal is constituted by a raised portion formed on a side edge of the welded portion.

4. The wiring module according to claim 1, wherein the detection terminal is a voltage detection terminal configured to detect a voltage of the single battery.

5. A detection terminal to be overlaid on a bus bar that connects adjacent electrode terminals of a plurality of single batteries and is to be used to detect a state of a single battery among the plurality of single batteries, provided with:
   a welded portion to be welded onto the bus bar,
   a locked portion that locks to a locking portion provided on the bus bar and holds the detection terminal in a state in which the welded portion is overlaid on the bus bar, and
   a reinforcing portion that prevents the welded portion from performing a bending deformation so as to keep the welded portion in a flat plate shape overlaid on the bus bar.

* * * * *